May 23, 1961  C. J. SCHNERING  2,985,745
COMPOSITE STRUCTURE

Filed April 27, 1959

INVENTOR
Charles J. Schnering
BY
Robert E. Strausser
ATTORNEY

May 23, 1961   C. J. SCHNERING   2,985,745
COMPOSITE STRUCTURE

Filed April 27, 1959   2 Sheets-Sheet 2

INVENTOR
Charles J. Schnering
BY
Robert E. Strausser
ATTORNEY

United States Patent Office 2,985,745
Patented May 23, 1961

2,985,745

COMPOSITE STRUCTURE

Charles J. Schnering, Lock Haven, Pa., assignor to Sylvania Electric Products Inc., a corporation of Delaware Filed Apr. 27, 1959, Ser. No. 809,098

5 Claims. (Cl. 219—117)

This invention relates to a composite structure and more particularly to a structure for use in an electron discharge device and methods for fabricating the structure.

In the production of electron discharge devices, it is necessary to make secure electrical and mechanical connections between the various elements in the tube structure. Many of the connections, such as between an element and support rod, may be made by tightly wrapping a portion of the element about the support rod and then electrically welding the parts together. In situations which do not lend themselves to the use of this method, the parts which are to be assembled are formed independently and subsequently assembled and welded.

Manufacturing tolerances are necessary in the fabrication of individual components for economic reasons. These tolerances result in variations in the separation between the parts in their assembled relationship. This variation in spacing is added to the separation which must be left between the parts to be joined so that they may be fitted together. Therefore, when the parts are slipped together or otherwise assembled, they will form a fairly loose fit which must be eliminated in some manner so that good electrical and mechanical contact may be made for permanently bonding the parts together.

Heretofore, preparatory tightening between metal parts was accomplished primarily by the use of pressure applied to the parts through the welding electrodes. The welding electrodes were positioned at diametrically opposed points on the outer member and then sufficient pressure was applied through the electrodes to deform the outer member so that electrical contact was made with the inner member. The contact was produced in a highly localized area directly beneath the dimple or depression formed in the outer member by the welding electrodes.

Application of some pressure to the parts which are to be welded together is a normal part of the joining process to insure good electrical contact once the members have been otherwise brought together. Certain levels of pressure have been determined as being required for the formation of a good bond. In the prior art methods the welding pressure and tightening pressure were applied simultaneously. An appreciable, but unknown, percentage of the pressure applied through the welding electrodes was expended in deforming the outer member so that it would make contact with the inner member. Due to the part to part variation in the amount of pressure required to cause the proper deformation, varying amounts of pressure were left available for the welding portion of the process. This resulted in a considerable variation in the quality of the welds formed. Therefore, it is an object of this invention to make more uniform the welding pressure available for the joining operation in the production of a composite structure.

Another object of this invention is to increase the reliability of a composite structure employed in electron discharge devices.

Another object of this invention is to increase the reliability of joints produced in the fabrication of electrode structures.

These and other objects are achieved in one aspect of the invention by the provision of a composite structure comprising an electrode support rod and a member having an apertured rod encompassing portion positioned about at least a segment of the rod, the member being joined to the rod at a point substantially diametrically opposed to the midpoint of the aperture in the encompassing portion whereby the member is rigidly supported on the rod.

For a better understanding of the invention, reference is made to the following description taken in conjunction with the accompanying drawings in which.

Figure 1:
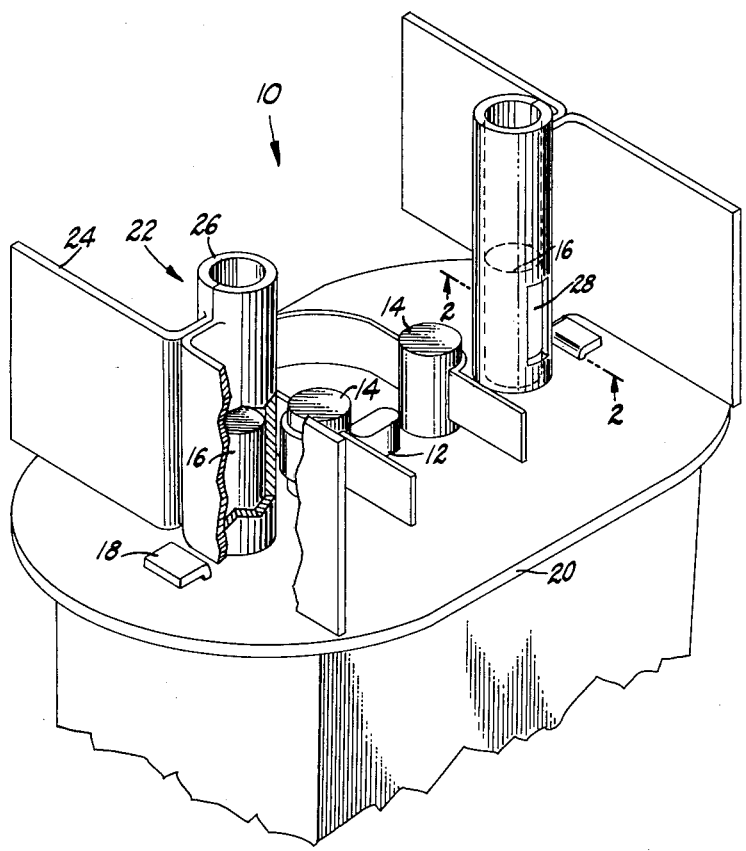
Fig. 1 is a perspective view of the upper portion of an electron discharge device showing a composite structure employing one embodiment of the invention.
Figure 2:
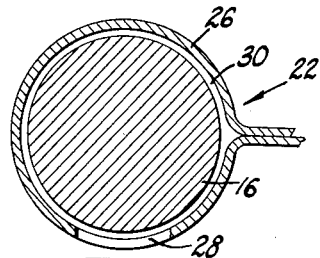
Fig. 2 is a cross-sectional view taken along the structure of Fig. 1 taken along the line 2—2 of Fig. 1 showing the composite structure prior to the welding operation.

Fig. 1 shows a portion of an electrode assembly 10 typical of those used in electron discharge devices. The assembly contains a plurality of electrodes such as a cathode, first grid, second grid and anode. The cathode sleeve 12, first grid support rods 14, second grid support rods 16, and anode tabs 18 pass through and are secured in an insulating spacer 20. In certain tube types, a considerable amount of current is drawn by the grid lateral wires from the electron stream which flows from the cathode to the anode. This grid current generates a considerable amount of heat in the lateral wires which must be dissipated by the side rods of the grid to which they are attached. Unless the heat is properly dissipated, the configuration of the grid laterals will be effected and thus the electrical characteristics of the tube will be changed. In order to increase the heat dissipating characteristics of the side rods and thus protect the grids from danger, a radiator 22 is attached to the side rod 16 above the insulating spacer 20 as shown in Fig. 1.

In the particular embodiment shown, the radiator 22 comprises wing members 24 and a tubular body portion 26 which encompasses a segment of the side rod 16. An aperture 28 is provided in the body of the radiator.

After the electrode structure 10 has been assembled, the grid side rods 16 extend a short distance beyond the insulating spacer 20. The radiator 22 is then positioned about the projecting segment of the side rod for attachment thereto.

The reliability of the composite structure is increased by increasing the weld area over that previously obtained with similar welding electrodes. The size of the welding electrodes is limited by the working area available. In the embodiment shown, the aperture 28, whose width subtends an angle of less than 90 degrees of the circumference of tubular member 26, allows the weld area to be increased. This aperture 28 is used either to allow direct contact of one of the welding electrodes with the inner member (see Fig. 3) or it may be used to decrease the amount of force required to deform the outer member (see Fig. 4). The shape of the aperture is dependent upon the configuration and size of the parts involved.

Figure 3:
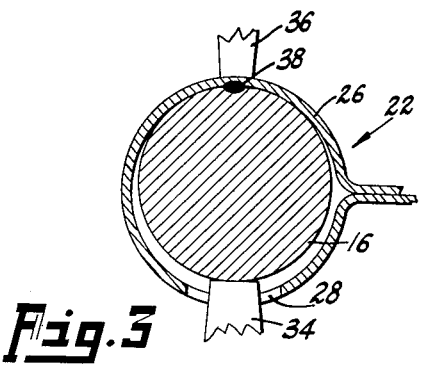
Fig. 3 is a cross-sectional view similar to Fig. 2 showing the composite structure with the welding electrodes in place and the weld formed.
Figure 4:
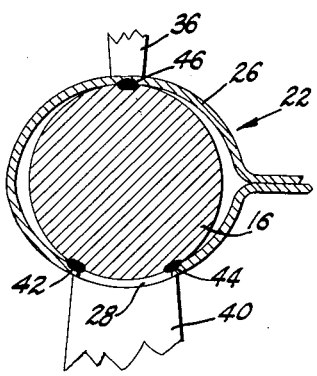
Fig. 4 is a cross-sectional view of another embodiment of the invention which utilizes a multi-point weld structure.

In Fig. 3 the first welding electrode 34 is shown passed through the aperture 28 in the outer member 26 and in contact with side rod 16. The second welding electrode 36 cooperates to press the body portion of the radiator 22 against the side rod, closing the gap 30. This produces contact pressure over a considerable area of the junction between the side rod and the body without requiring the expenditure of any force to deform the rod encompassing part 26 of the radiator. The weld 38 occurs at a point substantially diametrically opposed to the midpoint of the aperture when the welding current is applied from a source, not shown. This greatly increases the weld area between the rod and the radiator over the almost point contact weld produced when a non-apertured radiator is used. It also reduces the arcing which occurs between the parts since they are in firm contact. Since no deformation is required, and with the variables of welding time, welding current, and pressure preset on the welding apparatus, the same weld quality can be produced time and again. This results in an extremely reliable weld connection which can be repeatedly reproduced.

In another embodiment of the invention, the contact area is increased by having the welding electrode 40 formed wide enough to span the aperture 28 in the radiator. When the welding electrode 40 is positioned at the midpoint of the long dimension of the aperture, the application of slight pressure will produce contact between the side rod and radiator. This embodiment produces two point welds 42, 44 at the junction of the edges of the aperture 28 and the side rod 16 and a weld 46 of larger area at a point substantially beneath the welding electrode 36 diametrically opposite the midpoint of the aperture 28 when the welding current is applied. This weld structure is also easily reproduced and is extremely reliable.

The structures as herein described are extremely stable and vibration resistant. Further, a high degree of accuracy of the final position of the assembled articles is maintained since the deformation which occurs is small and easily controlled.

Although several embodiments of the invention have been shown and described, it will be apparent to those skilled in the art that various changes and modifications may be made therein without departing from the scope of the invention as defined by the appended claims.

Having thus described my invention I claim:

1. A composite structure comprising an electrode support rod and a member having an apertured rod encompassing portion positioned about at least a segment of said rod, said portion being welded to said rod at a point substantially diametrically opposed to the midpoint of said aperture whereby said member is rigidly supported on said rod.

2. A composite structure comprising an electrode support rod and a member having an apertured rod encompassing portion positioned about at least a segment of said rod, said portion welded to said rod at the edges of said aperture and at a point substantially diametrically opposed to the midpoint of said aperture whereby said member is rigidly supported on said rod.

3. A composite structure comprising an electrode support rod and a member having an apertured rod encompassing portion positioned about at least a segment of said rod, the width of said aperture being less than the diameter of said rod, said encompassing portion being welded to said rod at a point substantially diametrically opposed to the midpoint of said aperture whereby said member is rigidly supported by said rod.

4. A composite structure comprising an electrode support rod and a member having an apertured rod encompassing portion positioned about at least a segment of said rod, the width of said aperture being less than the diameter of said rod, said encompassing portion being welded to said rod at the opposed edges of said aperture and at a third point substantially diametrically opposed to the midpoint of said aperture whereby said member is rigidly supported by said rod.

5. In a method of fabricating a composite structure the steps of forming an aperture in the wall of the first member, positioning the first member about the second member whereby a portion of said second member is opposed to said aperture in said first member, placing a first welding electrode in a spanning relation with said aperture in said first member and placing a second welding electrode in contact with said first member at a point opposed to said first electrode, and applying sufficient mechanical pressure and passing electrical current between said first and second electrodes to form a weld between said first and second members at the opposed edges of the aperture and at a third point opposed to the mid-point of the aperture.

References Cited in the file of this patent

UNITED STATES PATENTS

| | | |
|---|---|---|
| 2,007,892 | Farr | July 9, 1935 |
| 2,062,287 | Block | Dec. 1, 1936 |
| 2,229,734 | Goodale | Jan. 28, 1941 |